United States Patent [19]

Korpman

[11] 4,328,269

[45] May 4, 1982

[54] PRESSURE SENSITIVE ADHESIVE AND TAPE

[75] Inventor: Ralf Korpman, Bridgewater, N.J.

[73] Assignee: Permacel, New Brunswick, N.J.

[21] Appl. No.: 181,288

[22] Filed: Aug. 25, 1980

[51] Int. Cl.³ .............................................. C09J 7/02
[52] U.S. Cl. ................................... 428/40; 428/354; 428/355; 428/522; 428/532
[58] Field of Search ................. 427/208.4; 428/355, 428/354, 522, 532, 40

[56] References Cited

U.S. PATENT DOCUMENTS 2,855,925  10/1958  Novak .............................. 427/208.4

*Primary Examiner*—Bernard D. Pianalto
*Attorney, Agent, or Firm*—Alice O. Robertson

[57] ABSTRACT

A normally tacky and pressure-sensitive adhesive which is dispersible in water is obtained a composition comprising an acrylate modified polysaccharide, i.e., a polysaccharide polyacrylate, and a polyhydroxy compound by subjecting the composition to a short heat cycle.

4 Claims, No Drawings

PRESSURE SENSITIVE ADHESIVE AND TAPE

The present invention relates to novel normally tacky and pressure-sensitive adhesives which are dispersible in water. The invention also includes sheets or tapes employing such adhesives, particularly tapes suitable for forming splices in paper manufacture.

In making new paper, a large source of paper pulp is repulped salvaged spliced paper. When spliced paper is repulped in the production of new paper, if the adhesive of the splicing tape is insoluble or indispersible in water, it may block the screen or form tiny specks in the newly formed paper and detract from the appearance thereof. In order to overcome this disadvantage, it is essential that the adhesive used in forming the spliced paper be dispersible in water when the spliced paper is repulped. Although some water dispersible pressure-sensitive adhesives are known such as the polyvinyl pyrrolidone pressure-sensitive adhesives described in U.S. Pat. No. 3,096,202, most of the pressure-sensitive adhesives are either (a) elastomer based, i.e., a mixture of elastomer and a tackifying resin, (b) acrylate based. These major types of adhesive materials are indispersible in water.

According to the present invention, it has been found that a water dispersible pressure-sensitive adhesive may be produced employing in combination certain of the materials known primarily as absorbents and certain polyhydroxy compounds, and subjecting the combination to elevated temperatures. More specifically, pressure-sensitive adhesives of the present invention may be produced from a composition comprising an aliphatic polyhydroxy compound and an acrylate modified polysaccharide material as hereinafter defined, by subjecting the composition to a temperature of from about 90° to 200° C. or from about 1 to about 60 seconds. The pressure-sensitive adhesive is most useful in the form of sheets and tapes, and pressure-sensitive adhesive sheets or tapes constitute a preferred embodiment of the present invention. The pressure-sensitive adhesive tape comprises a flexible backing sheet coated on at least one major surface with a water soluble normally tacky and pressure-sensitive adhesive, said adhesive obtained by coating a composition comprising an aliphatic polyhydroxy compound and an acrylate modified polysaccharide, onto the backing sheet subjecting the composition to a temperature of from about 90° to 200° C. for from about 1 to 60 seconds.

The acrylate modified polysaccharide absorbent material suitable as component of the adhesive compositions are of a type generally available commercially as "superabsorbents" taught to be usable to enhance moisture or water absorption of articles such as diapers, sanitary napkins, bed pads and the like.

By "acrylate modified polysaccharide" is meant that a polysaccharide, starch or cellulose, has grafted thereon a polyacrylate or acrylate polymer chain containing one or more of the following acrylate, i.e., acrylic acid derived, groups: acrylate salt, acrylic acid, acrylate ester, acrylamide or hydrolyzed acrylonitrile. It is also often referred to as polysaccharide (starch or cellulose) polyacrylate or polysaccharide acrylate polymer. Representative acrylate modified polysaccharides are described in U.S. Pat. No. 4,076,663. Preferred polysaccharides have chains terminated by an acrylate salt group or a mixture of acrylate salt and acrylamide groups. The modified polysaccharides are sometimes referred to in the literature as starch or cellulose graft copolymers.

In the polysaccharide acrylate polymers, the polyacrylate chain is attached to the backbone of the polysaccharide through a carbon linkage. The polyacrylate chain is primarily of the general formula:

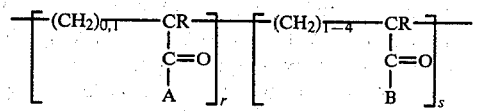

wherein

and

independently represents an acid, ester, alkali metal salt, ammonium salt, or amide group, each R independently is hydrogen or lower alkyl, r is an integer of from 0 to about 5000 and s is an integer of from 0 to about 5000, and r plus s is at least 500.

The polysaccharide acrylate polymers may be prepared, for example, by polymerizing an appropriate polysaccharide with acrylonitrile or methacrylonitrile, with methyl or ethyl acrylate, with acrylic or methacrylic acid, or with acrylamide or methacrylamide, and thereafter hydrolyzing the resulting polymer in whole or in part with aqueous alkali. Alternatively, they may be prepared by polymerizing an alkali metal salt of acrylic or methacrylic acid.

The procedures for carrying out graft-copolymerization of olefinically unsaturated chains onto cellulose and starch are well known in the art. Grafting of the hydrophilic material onto a starch or cellulose backbone can be accomplished simultaneously with the formation of the hydrophilic polymeric material in an aqueous medium, because the peroxide catalyst used to copolymerize the hydrophilic group producing monomers forms a redox catalyst system in combination with a reducing agent to effect chain transfer onto the starch or cellulose backbone. Reducing agents which may be employed include ceric ion, ferrous ion, cobaltic ion, and cuprous ion which may be supplied in the form of salts, e.g., ceric ammonium nitrate, ferrous ammonium sulfate, and the like. Graft copolymerization of olefinically-unsaturated chains also may be effected by irradiation (ultraviolet-, gamma-, or X-radiation) or by heating in an aqueous medium in the presence of an emulsifier.

In carrying out the operation, powdered starch or fibrous or pulpy cellulose is slurried in water containing a graft copolymerization catalyst system and the hydrophilic monomeric acrylate is added to the slurry and polymerized in situ at ambient temperature or above depending on the catalyst employed to obtain an acrylate modified polysaccharide. In this operation, a portion of the simultaneously formed hydrophilic acrylate polymer also may be physically entrapped into the polysaccharide backbone material during the polymerization process. The graft-copolymers produced are recovered and dried at atmospheric pressure to obtain a relatively stiff and brittle material which may be comminuted to the desired particle size.

Other methods for producing polyacrylate polysaccharide graft copolymers may be found in U.S. Pat. Nos. 2,922,768, 3,526,372, 3,661,815, 3,935,099, 4,028,290 and 4,076,663.

Suitable polysaccharide acrylate polymers are those in which the hydrophilic chain loading on the backbone is within the range of from about 10 percent by weight to about 90 percent by weight, commonly from about 40 to about 80 percent by weight of the graft copolymer. These materials are available in particle size of from one micron to $2 \times 10^4$ microns in diameter or cross section and is preferably in the form of a powder i.e., $1 \times 10^3$ microns or less. If they are obtained in larger particles, solids may be comminuted to the appropriate size.

The polyhydroxy compound of the compositions is liquid and is aliphatic with at least two adjacent hydroxy groups. Preferred compounds have more hydroxy groups such as glycerol.

The relative amount of the components vary with the particular hydroxy compound and acrylate modified polysaccharide. Generally, the useful amount ranges from about 20 to 100 parts by weight, preferably from about 30 to 50 parts by weight of the acrylate modified polysaccharide for every 100 parts by weight of the polyhydroxy compound. The composition may be modified by minor amounts of inert solid or liquid materials for desired spreading properties.

The preferred adhesive composition is the combination of acrylate modified starch and glycerol.

In preparing the adhesive, the mixture comprising acrylate modified polysaccharide and polyhydroxy compound is coated onto a substrate and the coated substrate subjected to a temperature of from about 90° C. to 200° C. for from 1 to about 60 seconds to obtain a rubbery pressure-sensitive adhesive film. If an unsupported pressure-sensitive adhesive is desired, the mixture is coated on a releasble surface, such as silicone liner instead of a substrate.

Suitable substrates are flexible backing material such as polyester film, vinyl film, elastic film, cellophane, foil, cloth, paper, polyvinyl alcohol film and the like. It is particularly appropriate for coating onto paper, especially tissue (unsized) paper to provide tapes which may be used as splicing tape in paper manufacture. When the tape is to be wound in roll form, there may be used an interliner or a release coating on the backside of the backing in order to facilitate easy unwind of the tape roll.

The adhesive films are hydrophilic and disperse in water and in polar solvents such as ethanol and isopropanol. When employed in an unsized paper backing tape for splicing paper, paper scraps from one manufacturing operation are repulpable and suitable for production of new paper.

The following examples illustrate water dispersible pressure sensitive adhesives and adhesive tapes in accordance with the present invention but are not to be construed as limiting.

In each of the examples the components of the compositions are mixed together on the substrate indicated and heated for the times indicated, at the coating weight indicated to produce water dispersible pressure-sensitive adhesive sheets which may be cut into tapes.

EXAMPLE I

| | |
|---|---|
| Starch Polyacrylate (SPG 502S, Henkel) | 30 parts by weight |
| Glycerol | 100 parts by weight |
| Substrate: | tissue paper |
| Coating weight: | 1.5 ounces per square yard (each side) |
| Heating temperature: | 250° F. (121° C.) |
| Heating time: | 10 seconds |

EXAMPLE II

| | |
|---|---|
| Starch Polyacrylate (Stasorb*, A.E. Staley) | 40 parts by weight |
| Glycerol | 100 parts by weight |
| Substrate: | impregnated paper |
| Coating weight: | 2 ounces per square yard (each side) |
| Heating temperature: | 300° F. (149° C.) |
| Heating time: | 50 seconds |

EXAMPLE III

| | |
|---|---|
| Starch Polyacrylate (SPG 502S) | 50 parts by weight |
| Glycerol | 100 parts by weight |
| Substrate: | terephthalate film |
| Coating weight: | 1 ounce per square yard (each side) |
| Heating temperature: | 250° F. (121° C.) |
| Heating time: | 25 seconds |

The commercial starch polyacrylate in the foregoing examples are hydrolyzed polyacrylonitrile grafted to starch.

When the foregoing compositions are employed for splicing tapes in paper manufacture, the backing tape is generally unsized and in addition both sides of the tape are coated with the adhesive composition prior to the heating step. The adhesive tape may then be employed to splice paper by applying the tape to the end portion of one web of paper followed by overlapping the front or tip portion of the other web to form the desired splice. Other conventional methods also may be employed.

EXAMPLE IV

A mixture of 50 parts by weight of starch polyacrylate (SPGS) and 100 parts by weight of glycerol is coated on a silicone liner and heated for 20 seconds at 300° F. (149° C.) to obtain a pressure-sensitive adhesive film which is then wound on a silicone liner for storage.

I claim:

1. A pressure-sensitive adhesive tape comprising (1) a backing layer and (2) a pressure-sensitive adhesive layer, said adhesive layer obtained by coating the backing layer with a mixture comprising an aliphatic polyhydroxy compound having adjacent hydroxy groups and an acrylate modified polysaccharide selected from the group consisting of starch polyacrylate and cellulose polyacrylate, and thereafter heating the coated sheet to a temperature of from about 90° C. to 200° C. for from about 1 to 60 seconds.

2. An adhesive tape according to claim 1 in which the polyhydroxy compound is glyercol and the acrylate modified polysaccharide is starch polyacrylate.

3. A tape according to claim 2 in which the starch polyacrylate is present in an amount of from about 20 to 100 parts by weight for every 100 parts by weight of glycerol.

4. A pressure-sensitive adhesive film obtained by coating a mixture comprising an aliphatic polyhydroxy compound and an acrylate modified polysaccharide on a releasable surface and heating for from 90° C. to 200° C. for from about 1 to about 60 seconds wherein said acrylate modified polysaccharide is selected from the group consisting of starch polyacrylate and cellulose polyacrylate.

* * * * *